(12) United States Patent
Zheng et al.

(10) Patent No.: US 11,641,606 B2
(45) Date of Patent: May 2, 2023

(54) RESOURCE CONFIGURATION METHOD, MOBILE TERMINAL, NETWORK-SIDE DEVICE, AND MEDIUM

(71) Applicant: VIVO MOBILE COMMUNICATION CO., LTD., Guangdong (CN)

(72) Inventors: Qian Zheng, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 50 days.

(21) Appl. No.: 17/131,857

(22) Filed: Dec. 23, 2020

(65) Prior Publication Data

US 2021/0112435 A1 Apr. 15, 2021

Related U.S. Application Data

(63) Continuation of application No. PCT/CN2019/091220, filed on Jun. 14, 2019.

(30) Foreign Application Priority Data

Jun. 25, 2018 (CN) .......................... 201810663784.4

(51) Int. Cl.
*H04W 8/24* (2009.01)
*H04W 24/08* (2009.01)
(Continued)

(52) U.S. Cl.
CPC ..... *H04W 36/00837* (2018.08); *H04W 8/245* (2013.01); *H04W 24/08* (2013.01);
(Continued)

(58) Field of Classification Search
CPC .. H04B 7/02–12; H04B 17/0082–3913; H04L 5/0001–0098; H04W 8/22–245;
(Continued)

(56) References Cited

U.S. PATENT DOCUMENTS

2011/0039557 A1\* 2/2011 Narasimha ............ H04W 24/10
2014/0126545 A1   5/2014 Tamura et al.
(Continued)

FOREIGN PATENT DOCUMENTS

CN   101588610 A   11/2009
CN   101883381 A   11/2010
(Continued)

OTHER PUBLICATIONS

3GPP TSG-RAN WG4 Meeting #78bis; R4-162425; San Jose del Cabo, Mexico, Apr. 11-15, 2016; "Further discussion on RRM candidate solutions in connected mode under high speed scenarios"; 5 pages.

(Continued)

*Primary Examiner* — Timothy J Weidner
(74) *Attorney, Agent, or Firm* — Brooks Kushman P.C.

(57) ABSTRACT

A resource configuration method, a mobile terminal, a network-side device, and a medium are provided. The method includes: receiving configuration of at least one target cell resource, where the configuration of the at least one target cell resource includes at least one trigger condition for user equipment UE to use the target cell resource; based on a signal quality measurement quantity of a current serving cell of the UE, evaluating whether the at least one trigger condition is satisfied; and determining that the trigger condition is satisfied, and initiating, based on the configuration of the target cell resource, a communication process associated with the trigger condition.

20 Claims, 5 Drawing Sheets

(51) Int. Cl.
| | |
|---|---|
| *H04W 24/10* | (2009.01) |
| *H04W 28/02* | (2009.01) |
| *H04W 28/08* | (2023.01) |
| *H04W 36/00* | (2009.01) |
| *H04W 36/30* | (2009.01) |
| *H04W 36/36* | (2009.01) |
| *H04W 52/02* | (2009.01) |
| *H04W 72/08* | (2009.01) |
| *H04W 76/15* | (2018.01) |
| *H04W 76/27* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |
| *H04W 72/542* | (2023.01) |

(52) U.S. Cl.
CPC ....... *H04W 24/10* (2013.01); *H04W 28/0247* (2013.01); *H04W 28/0815* (2020.05); *H04W 36/0069* (2018.08); *H04W 36/0072* (2013.01); *H04W 36/0085* (2018.08); *H04W 36/30* (2013.01); *H04W 36/36* (2013.01); *H04W 52/0229* (2013.01); *H04W 72/542* (2023.01); *H04W 76/15* (2018.02); *H04W 76/27* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 24/02–10; H04W 28/02–26; H04W 36/0005–385; H04W 48/02–20; H04W 52/02–0293; H04W 72/005–14; H04W 74/002–008; H04W 76/10–50; H04W 84/02–16; H04W 88/005–12; H04W 92/02; H04W 92/04; H04W 92/10; H04W 92/16; H04W 92/20
See application file for complete search history.

(56) References Cited

U.S. PATENT DOCUMENTS

| | | |
|---|---|---|
| 2015/0133121 A1 | 5/2015 | Li et al. |
| 2016/0112116 A1 | 4/2016 | Jalali et al. |
| 2020/0068461 A1* | 2/2020 | Hu .................... H04W 36/0072 |
| 2020/0154326 A1* | 5/2020 | Deenoo ........... H04W 36/00837 |

FOREIGN PATENT DOCUMENTS

| | | |
|---|---|---|
| CN | 102056211 A | 5/2011 |
| CN | 102264093 A | 11/2011 |
| CN | 103442402 A | 12/2013 |
| CN | 102404810 B | 2/2015 |
| CN | 105704769 A | 6/2016 |
| CN | 107124740 A | 9/2017 |
| EP | 2905996 A1 | 8/2015 |
| WO | 2010121549 A1 | 10/2010 |
| WO | 2016130062 A1 | 8/2016 |

OTHER PUBLICATIONS

3GPP TSG-RAN2#101; R2-1802486 (resubmission of R2-1801493); Athens, Greece, Feb. 26-Mar. 2, 2018; "Introduction of Conditional handover"; 5 pages.
First Office Action dated May 6, 2020 issued in Chinese Application No. 201810663784.4.
International Preliminary Report on Patentability dated Jan. 7, 2021 issued in PCT/CN2019/091220.
Search Report dated Mar. 11, 2020 issued in Chinese Application No. 201810663784.4.
Second Office Action dated Aug. 19, 2020 issued in Chinese Application No. 201810663784.4.
Ericsson: "Conditional Handover", 3GPP Draft; R2-1803336—Conditional Handover, 3rd Generation Partnership Project (3GPP), Mobile Competence Centre;; 650, Route Des Lucioles; F-06921 Sophia_Antipolis Cedex; France, vol. RAN WG2, No. Athens, Greece; Feb. 26, 2018-Mar. 2, 2018 Feb. 16, 2018 (Feb. 16, 2018), XP051400471, Retrieved from the internet: URLhttp://www.3gpp.org/ftp/tsg%5Fran/WG2%5FRL2/TSGR2%5F101/Docs/ [retrieved on Feb. 16, 2018].
Supplementary European Search Report, dated Jul. 15, 2021 issued in EP19826843.

\* cited by examiner

RESOURCE CONFIGURATION METHOD, MOBILE TERMINAL, NETWORK-SIDE DEVICE, AND MEDIUM

CROSS-REFERENCE TO RELATED APPLICATIONS

This application is a continuation application of International Application No. PCT/CN2019/091220 filed on Jun. 14, 2019, which claims priority to Chinese Patent Application No. 201810663784.4, filed in China on Jun. 25, 2018, both disclosures of which are incorporated herein by reference in their entireties.

TECHNICAL FIELD

This disclosure relates to the communications field, and in particular, to a resource configuration method, a mobile terminal, a network-side device, and a computer storage medium.

BACKGROUND

In a new radio access technology (NR) system of a 5th Generation mobile communications (5G) system, user equipment (UE) uses a dual connectivity (DC) architecture. The DC architecture includes two cell groups, which are a master cell group (MCG) and a secondary cell group (SCG) respectively. The MCG corresponds to a master node (MN) on a network side, and the SCG corresponds to a secondary node (SN) on the network side. The MCG includes a primary serving cell (PCell) and a secondary serving cell (SCell). The SCG includes a primary secondary serving cell (PSCell) and a secondary serving cell (SCell). The PCell and the PSCell may also be collectively referred to as special cells (SpCell).

Generally, resources are configured by using a trigger condition. The trigger condition is based on a measurement result of a candidate cell and a measurement result of a current serving cell of the UE. This means that both the candidate cell and the current serving cell of the UE need to be considered for the trigger condition, causing that the UE consumes relatively great power.

SUMMARY

According to a first aspect, an embodiment of this disclosure provides a resource configuration method, including:
receiving configuration of at least one target cell resource, where the configuration of the at least one target cell resource includes at least one trigger condition for user equipment UE to use the target cell resource;
based on a signal quality measurement quantity of a current serving cell of the UE, evaluating whether the at least one trigger condition is satisfied; and
determining that the trigger condition is satisfied, and initiating, based on the configuration of the target cell resource, a communication process associated with the trigger condition.

According to a second aspect, an embodiment of this disclosure provides a resource configuration method, including:
setting at least one trigger condition for user equipment UE to use a target cell resource; and
sending configuration of the target cell resource, where the configuration of the target cell resource includes the at least one trigger condition for the UE to use the target cell resource, so that the UE evaluates, based on a signal quality measurement quantity of a current serving cell of the UE, whether the trigger condition is satisfied.

According to a third aspect, an embodiment of this disclosure provides a mobile terminal, including:
a receiving module, configured to receive configuration of at least one target cell resource, where the configuration of the at least one target cell resource includes at least one trigger condition for user equipment UE to use the target cell resource;
an evaluation module, configured to: based on a signal quality measurement quantity of a current serving cell of the UE, evaluate whether the at least one trigger condition is satisfied; and
a handover module, configured to: determine that the trigger condition is satisfied, and initiate, based on the configuration of the target cell resource, a communication process associated with the trigger condition.

According to a fourth aspect, an embodiment of this disclosure provides a network-side device, including:
a setting module, configured to set at least one trigger condition for user equipment UE to use a target cell resource; and
a sending module, configured to send configuration of the target cell resource, where the configuration of the target cell resource includes the at least one trigger condition for the UE to use the target cell resource, so that the UE evaluates, based on a signal quality measurement quantity of a current serving cell of the UE, whether the trigger condition is satisfied.

According to a fifth aspect, an embodiment of this disclosure further provides a mobile terminal, including:
a memory, configured to store a program; and
a processor, configured to run the program stored in the memory, to execute the resource configuration method according to the first aspect.

According to a sixth aspect, an embodiment of this disclosure further provides a network-side device, including:
a memory, configured to store a program; and
a processor, configured to run the program stored in the memory, to execute the resource configuration method according to the second aspect.

According to a seventh aspect, an embodiment of this disclosure further provides a computer-readable storage medium, where the computer-readable storage medium stores a computer program instruction, and when the computer program instruction is executed by a processor, the resource configuration method according to the first aspect or the second aspect is implemented.

BRIEF DESCRIPTION OF DRAWINGS

The description of the embodiments of this disclosure below with reference to the accompanying drawings helps better understand this disclosure, where same or similar reference numerals represent same or similar features.

DESCRIPTION OF EMBODIMENTS

To describe the purpose, technical solutions and advantages of this disclosure more clearly, the following further describes this disclosure in detail with reference to the accompanying drawings and specific embodiments.

Conditional handover indicates that when a trigger condition is satisfied, UE switches from a source node to a target node, to ensure normal use of the UE.

Figure 1:
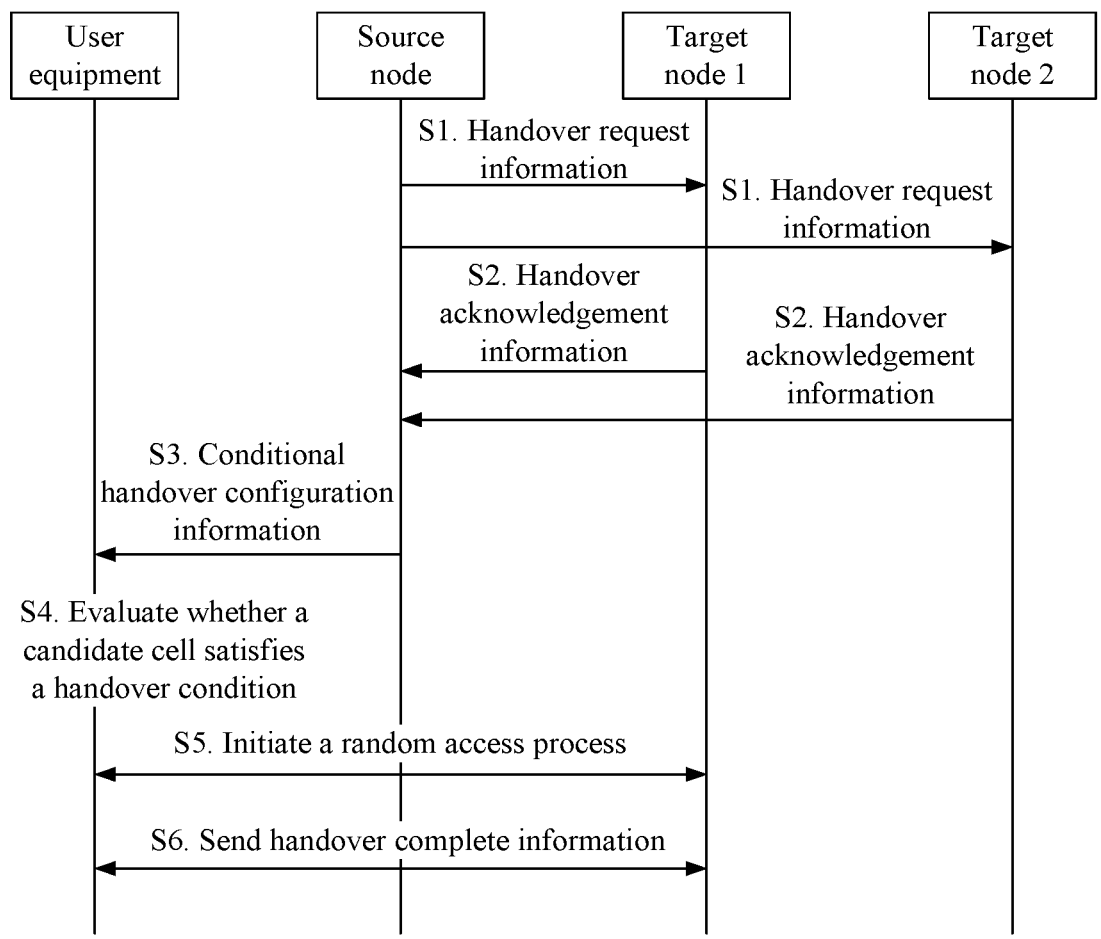
FIG. 1 is a schematic flowchart of conditional handover according to an embodiment of this disclosure.

FIG. 1 is a schematic flowchart of conditional handover according to an embodiment of this disclosure. UE, a source node, a target node 1, and a target node 2 are included.

The source node sends a measurement control message to the UE, and the UE feeds back a measurement report. Conditional handover resource configuration is based on a previous measurement report of the UE.

The following describes a specific procedure of conditional handover with reference to FIG. 1. The procedure includes S1 to S6.

S1. A source node sends handover request information to one or more target nodes.

S2. The target node performs admission control. The target node feeds handover acknowledgment information back to the source node.

S3. The source node sends conditional handover configuration information to UE.

S4. The UE evaluates whether candidate cells corresponding to the target nodes satisfy a trigger condition, and if the trigger condition is satisfied, the UE selects one target node for handover.

S5. The UE initiates a random access process with the selected target cell.

S6. The UE sends handover complete information to the target node.

When switching to the target node is performed in a trigger-condition-based manner, the UE determines, based on comparison between a measurement result of the candidate cell corresponding to the target node and that of the current serving cell of the UE, whether the trigger condition is satisfied. For instance, a difference between a signal quality parameter of the candidate cell and a signal quality parameter of the current serving cell of the UE is greater than a threshold. For another instance, a signal quality parameter of the current serving cell of the UE is less than a threshold 1 and a signal quality parameter of the candidate cell is greater than a threshold 2.

This means that both the candidate cell and the current serving cell of the UE need to be considered for the trigger condition, causing that the UE consumes relatively great power.

To resolve the technical problem that the UE consumes relatively great power, embodiments of this disclosure provide a resource configuration method, a mobile terminal, a network-side device, and a computer storage medium.

Figure 2:
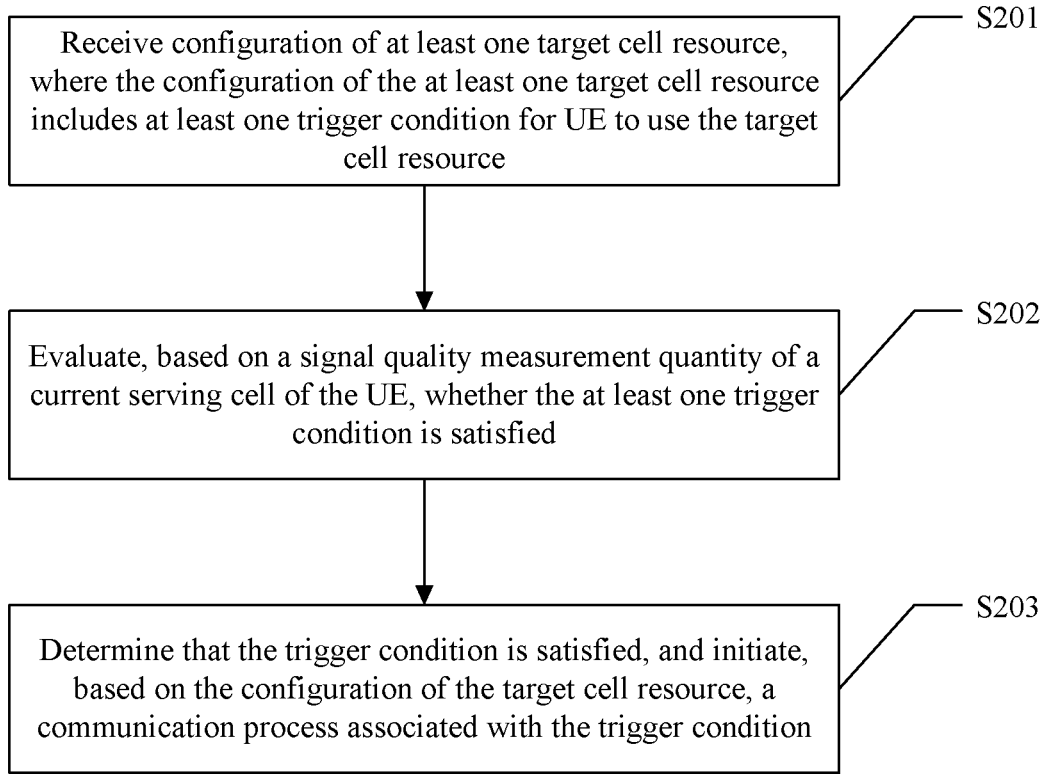
FIG. 2 is a schematic flowchart of a resource configuration method according to an embodiment of this disclosure.

FIG. 2 is a schematic flowchart of a resource configuration method according to an embodiment of this disclosure. The method may be executed by UE. The method includes steps S201 to S203.

S201. Receive configuration of at least one target cell resource, where the configuration of the at least one target cell resource includes at least one trigger condition for UE to use the target cell resource.

The target cell is a cell corresponding to a target node, and the configuration of the target cell resource is configuration used by the UE to initiate a communication process in the target cell. It should be noted that the configuration of the target cell resource includes the at least one trigger condition for the UE to use the target cell resource. In other words, the configuration of the target cell resource includes one or more trigger conditions for the UE to use the target cell resource. To be specific, a number of a signal quality measurement quantity of the current serving cell of the UE is the same as a number of trigger conditions.

The UE may receive configuration of one target cell resource, or the UE may also receive configuration of a plurality of target cell resources. That is, when receiving the configuration of the target cell resource, the UE can perform evaluation.

The trigger condition for the UE to use the target cell resource may be set based on the target cell. In other words, each target cell has at least one trigger condition of the corresponding target cell resource. For each of the target cells, trigger conditions of target cell resources may be a same condition or different conditions.

S202. Evaluate, based on the signal quality measurement quantity of the current serving cell of the UE, whether the at least one trigger condition is satisfied.

The current serving cell of the UE is the serving cell on which the UE camps. The signal quality of the current serving cell of the UE can be evaluated based on the signal quality measurement quantity. To be specific, whether one trigger condition is satisfied may be evaluated based on the signal quality measurement quantity of the current serving cell of the UE.

When the UE receives configuration of a plurality of target cell resources, whether the at least one trigger condition is satisfied needs to be valuated based on the signal quality measurement quantity of the current serving cell of the UE.

S203. Determine that the trigger condition is satisfied, and initiate, based on the configuration of the target cell resource, a communication process associated with the trigger condition.

When determining that the at least one trigger condition is satisfied, the UE may initiate, based on the configuration of the target cell resource, the communication process associated with the trigger condition. That is, as long as one trigger condition is satisfied, the UE can initiate, based on the configuration of the target cell resource, the communication process associated with the trigger condition. Certainly, if a plurality of trigger conditions are satisfied, the UE may also initiate, based on the configuration of the target cell resource, the communication process associated with the trigger condition.

The communication process is a process of information exchange between the UE and a network-side device. For instance, the communication process may include one or more of the following: handover, RRC re-establishment, secondary cell group SCG addition, SCG modification, SCG deletion, and SCG change.

In this embodiment of this disclosure, in the process of initiating communication, the UE configures the resources based on the trigger condition of the target cell resource in conjunction with configuration conditions of some other target cell resources.

Optionally, the communication process may specifically be an RRC re-establishment process.

For instance, configuration condition of the target cell resource includes integrity protection check failure; and when the signal quality measurement quantity of the current serving cell of the UE satisfies the trigger condition for the UE to use the target cell resource and the integrity protection check failure is determined, the RRC re-establishment process is initiated in the target cell.

For instance, the configuration condition of the target cell resource includes radio link failure (RLF). When the signal quality measurement quantity of the current serving cell of the UE satisfies the trigger condition for the UE to use the target cell resource and a radio link failure is determined, the RRC re-establishment process is initiated in the target cell.

For instance, the communication process is specifically adding an SCG in a DC architecture. The configuration condition of the target cell resource includes that a data rate does not satisfy a service requirement. When the signal quality measurement quantity of the current serving cell of the UE satisfies the trigger condition for the UE to use the target cell resource and a data rate of the UE does not satisfy the service requirement, a target SCG is selected based on the target cell resource, and an SCG addition process is initiated.

For instance, the communication process is specifically modifying the SCG in the DC architecture. The configuration condition of the target cell resource includes that a packet loss rate of the UE does not satisfy a service requirement. When the signal quality measurement quantity of the current serving cell of the UE satisfies the trigger condition for the UE to use the target cell resource and the packet loss rate of the UE does not satisfy the service requirement, an SCG modification process is initiated to a source SCG.

In this embodiment of this disclosure, whether the at least one trigger condition is satisfied can be evaluated based on the signal quality measurement quantity of the current serving cell of the UE. When it is determined that the trigger condition is satisfied, a communication process associated with the trigger condition is initiated based on the configuration of the target cell resource. In other words, it may be necessary to evaluate only a signal quality condition of the current serving cell, thereby reducing unnecessary measurement of the target cell for the evaluation and further reducing power consumption of the UE.

In some embodiments of this disclosure, an RRC reconfiguration message may be used for modification of an RRC connection. The UE receives the configuration of the target cell resource by using the RRC reconfiguration message. The configuration of the target cell resource may be configuration of one target cell resource or configuration of a plurality of target cell resources. In this way, the UE can initiate, based on the configuration of the target cell resource, the communication process associated with the trigger condition.

In some embodiments of this disclosure, a newly defined information element represents the trigger condition for the UE to use the target cell resource, and the RRC reconfiguration message includes the newly defined information element. In this way, the UE can receive the configuration of the target cell resource based on the newly defined information element in the RRC reconfiguration message. Information elements (IE) are constituent units of an RRC message. The information elements are included in the message.

In addition, alternatively, an existing information element such as an information element of an A1 event may be used to represent the trigger condition for the UE to use the target cell resource. The RRC reconfiguration message includes the information element of the A1 event. In other words, the configuration of the target cell resource is received by using the existing information element, which further improves use efficiency of protocol-defined information elements.

In some embodiments of this disclosure, the signal quality measurement quantity of the current serving cell is used to measure the signal quality of the current serving cell. The signal quality measurement quantity of the current serving cell may include one or more parameters. The parameters may be reference signal received power (RSRP), reference signal received quality (RSRQ) and signal to interference plus noise ratio (SINR).

The foregoing different parameters are used to measure the signal quality measurement quantity of the current serving cell from different perspectives. It should be noted that in this embodiment of this disclosure, the signal quality of the current serving cell may be measured based on one of those parameters, or the signal quality of the current serving cell may be measured based on more than one of those parameters. Using a plurality of parameters to measure the signal quality of the current serving cell allows comprehensive and accurate measurement of the signal quality of the current serving cell.

In some embodiments of this disclosure, the trigger condition of the target cell resource includes a hysteresis parameter value of the signal quality measurement quantity of the current serving cell and a threshold of the signal quality measurement quantity of the current serving cell. The hysteresis parameter value of the signal quality measurement quantity of the current serving cell is a parameter for avoiding ping-pong handover or re-selection.

For different parameters of the signal quality measurement quantities of the current serving cell, there are corresponding hysteresis parameter values and thresholds. For instance, the signal quality measurement quantities of the current serving cell include two parameters: RSRP and SINR. In this case, a hysteresis parameter value of the RSRP is A1, and a threshold of the RSRP is B1; and a hysteresis parameter value of the SINR is A2, and a threshold of the RSRP is B2.

In this embodiment of this disclosure, it can be determined that the trigger condition is satisfied only when both the hysteresis parameter value of the signal quality measurement quantity of the current serving cell and the threshold of the signal quality measurement quantity of the current serving cell are satisfied.

In some embodiments of this disclosure, whether the trigger condition is satisfied may be specifically determined based on the hysteresis parameter value of the signal quality measurement quantity of the current serving cell and the threshold of the signal quality measurement quantity of the current serving cell. Specifically, it is determined that the trigger condition is satisfied when a sum of the signal quality measurement quantity of the current serving cell and the hysteresis parameter value of the signal quality measurement quantity of the current serving cell is less than the threshold of the signal quality measurement quantity of the current serving cell.

For instance, the signal quality measurement quantity of the current serving cell includes only one parameter: RSRP. The RSRP is R1, the hysteresis parameter value of the RSRP of the current serving cell is A1, and the threshold of the RSRP of the current serving cell is B1. When R1+A1 is less than B1, it indicates that the trigger condition is satisfied.

For another instance, the signal quality measurement quantities of the current serving cell include two parameters: RSRP and SINR. The RSRP is R1, the hysteresis parameter value of the SINR of the current serving cell is A1, and the threshold of the SINR of the current serving cell is B1; or the SINR is R2, the hysteresis parameter value of the SINR of the current serving cell is A2, and the threshold of the SINR of the current serving cell is B2. When R1+A1 is less than B1 or R2+A2 is less than B2, it indicates that the trigger condition is satisfied.

It can be learned from the foregoing embodiment that, for the signal quality measurement quantities of the current serving cell that include different numbers of parameters, use of more parameters means evaluation of more aspects of the signal quality of the current serving cell.

Figure 3:
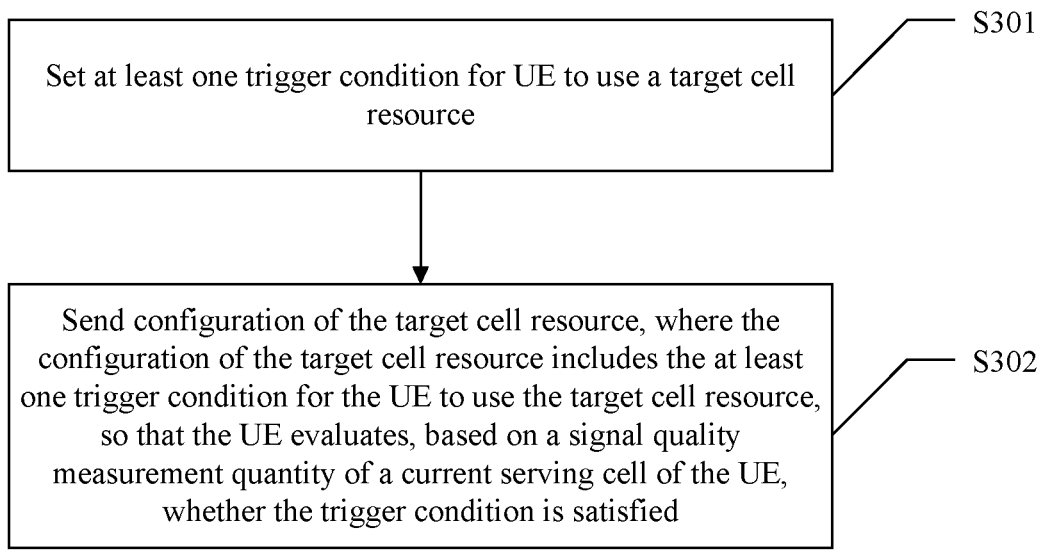
FIG. 3 is a schematic flowchart of a resource configuration method according to some other embodiments of this disclosure.

FIG. 3 is a schematic flowchart of a resource configuration method according to some other embodiments of this disclosure. The method may be executed by a network-side device. The method includes steps S301 and S302.

S301. Set at least one trigger condition for UE to use a target cell resource.

The network-side device sets the at least one trigger condition for the UE to use the target cell resource. In other words, one trigger condition is set corresponding to each signal quality measurement quantity of a current serving cell of UE. When there are signal quality measurement quantities of current serving cells of a plurality of UEs, the network-side device sets a plurality of corresponding trigger conditions.

S302. Send configuration of the target cell resource, where the configuration of the target cell resource includes the at least one trigger condition for the UE to use the target cell resource, so that the UE evaluates, based on a signal quality measurement quantity of a current serving cell of the UE, whether the trigger condition is satisfied.

The network-side device sends the configuration of the target cell resource to the UE. It should be noted that the configuration of the target cell resource is the at least one trigger condition preset by the network-side device in S301. In other words, the configuration of the target cell resource includes the at least one trigger condition for the UE to use the target cell resource.

The network-side device sends the configuration of the target cell resource to the UE, so that the UE valuates, based on the signal quality measurement quantity of the current serving cell, whether the trigger condition is satisfied. When determining that the signal quality measurement quantity of the current serving cell can satisfy the trigger condition after being evaluated, the UE may initiate, based on the configuration of the target cell resource, a communication process associated with the trigger condition.

In this embodiment of this disclosure, the at least one trigger condition for the UE to use the target cell resource is first set, and then the configuration of the target cell resource is sent, so that the UE evaluates, based on the signal quality measurement quantity of the current serving cell of the UE, whether the trigger condition is satisfied. It is necessary to evaluate only a signal quality condition of the current serving cell, thereby reducing unnecessary measurement of the target cell for the evaluation and further reducing power consumption of the UE.

In some embodiments of this disclosure, the at least one trigger condition for the UE to use the target cell resource may be preset based on a protocol. The protocol may be an existing protocol or a newly developed protocol. In this way, the network-side device presets the at least one trigger condition through the protocol, to avoid wasting signaling resources.

In some embodiments of this disclosure, the at least one trigger condition for the UE to use the target cell resource is set based on network configuration. The network configuration includes node configuration. To be specific, a node sets the at least one trigger condition for the UE to use the target cell resource.

The network configuration may include any one of the following configuration methods: configuration independently by a source node, configuration by the source node after negotiation between the source node and a target node, configuration independently by the target node, and configuration by the target node after negotiation between the target node and the source node.

The configuration independently by the source node indicates that the source node independently sets the at least one trigger condition for the UE to use the target cell resource, without a need to negotiate with the target node. Because negotiation with the target node is not required, wasting of network resources is avoided.

The configuration by the source node after negotiation between the source node and the target node indicates that the source node needs to negotiate with the target node before setting the at least one trigger condition for the UE to use the target cell resource. The configuration by the source node after negotiation can be recognized by both the source node and the target node, which can improve a success rate of the communication process.

The configuration independently by the target node indicates that the target node independently sets the at least one trigger condition for the UE to use the target cell resource, without a need to negotiate with the source node. Because negotiation with the source node is not required, wasting of network resources is avoided.

The configuration by the target node after negotiation between the target node and the source node indicates that the target node needs to negotiate with the source node before setting the at least one trigger condition for the UE to use the target cell resource. The configuration by the target node after negotiation can be recognized by both the source node and the target node, which can improve a success rate of the communication process.

In some embodiments of this disclosure, during a cell handover process of a single base station scenario, the source node may be a source base station in the handover process, and a corresponding target node is the target base station in the handover process.

In the DC scenario, in one case, the source node is a source SN, and the corresponding target node is a target SN; and in another case, the source node is a source MN, and the corresponding target node is a target SN.

Figure 4:
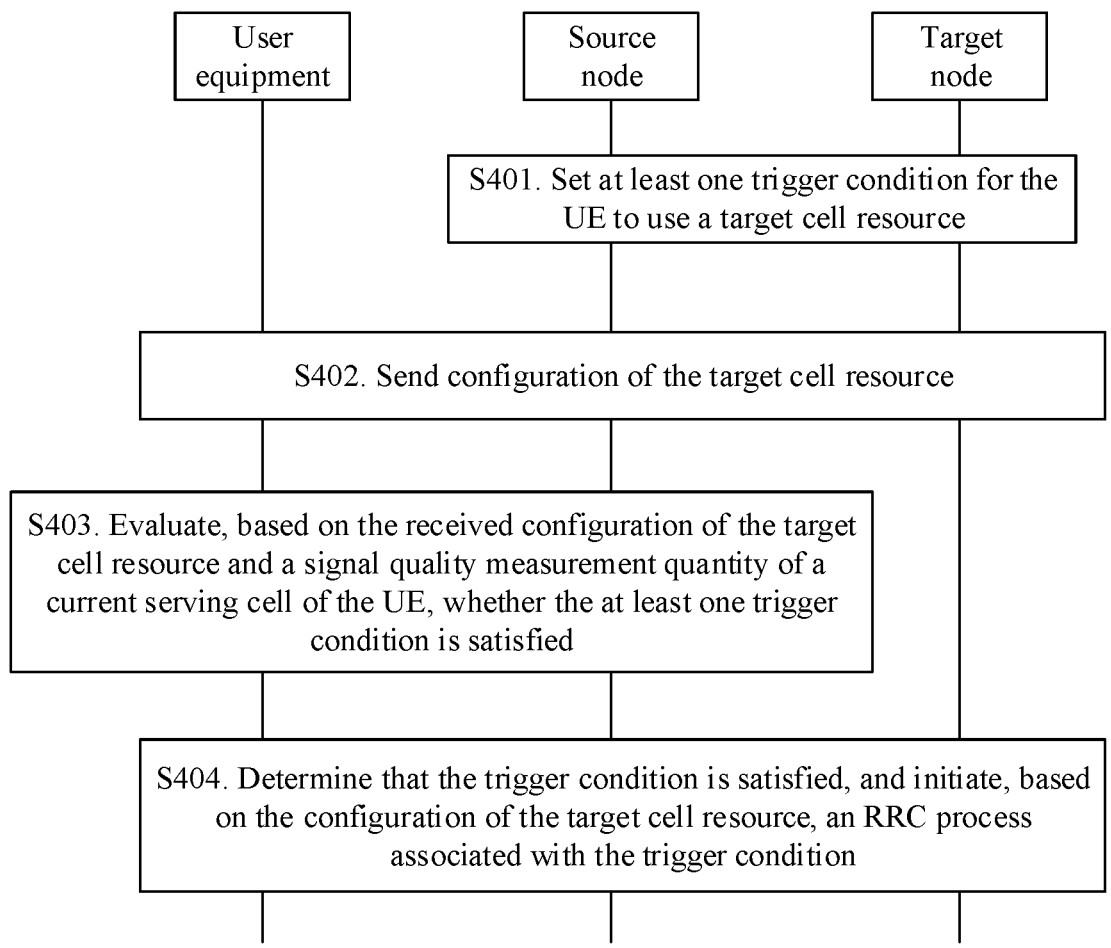
FIG. 4 is a schematic flowchart of configuring a resource to initiate an RRC process according to an embodiment of this disclosure.

FIG. 4 is a schematic flowchart of configuring a resource to initiate an RRC process according to an embodiment of this disclosure. A network-side device includes a source node and a target node. The method specifically includes steps S401 to S404.

S401. Set at least one trigger condition for UE to use a target cell resource.

S402. Send the configuration of the target cell resource.

The configuration of the target cell resource includes the at least one trigger condition for the UE to use the target cell resource.

S403. Evaluate, based on the received configuration of the target cell resource and the signal quality measurement quantity of the current serving cell of the UE, whether the at least one trigger condition is satisfied.

S404. Determine that the trigger condition is satisfied, and initiate, based on the configuration of the target cell resource, an RRC process associated with the trigger condition.

Figure 5:
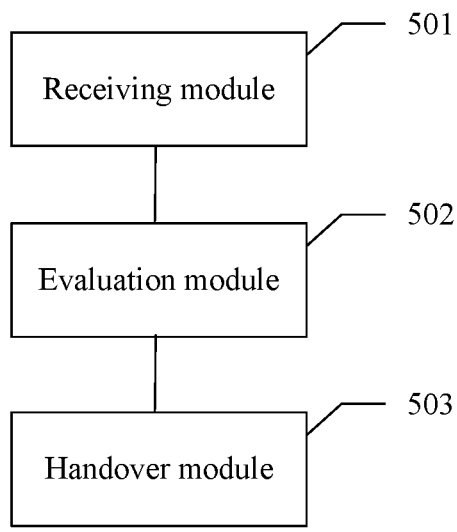
FIG. 5 is a schematic structural diagram of a mobile terminal according to an embodiment of this disclosure.

FIG. 5 is a schematic structural diagram of a mobile terminal according to an embodiment of this disclosure. The mobile terminal is corresponding to the resource configuration method. The mobile terminal specifically includes:

a receiving module 501, configured to receive configuration of at least one target cell resource, where the configuration of the at least one target cell resource includes at least one trigger condition for UE to use the target cell resource;

an evaluation module 502, configured to evaluate, based on a signal quality measurement quantity of the current serving cell of the UE, whether the at least one trigger condition is satisfied; and a handover module 503, configured to: determine that the trigger condition is satisfied, and initiate, based on the configuration of the target cell resource, a communication process associated with the trigger condition.

In some embodiments of this disclosure, the receiving module 501 is specifically configured to receive the configuration of the at least one target cell resource by using an RRC reconfiguration message.

In some embodiments of this disclosure, the RRC reconfiguration message includes a newly defined information element, and the newly defined information element represents the trigger condition for the UE to use the target cell resource;

or;

the RRC reconfiguration message includes an information element of an A1 event, and the information element of the A1 event represents the trigger condition for the UE to use the target cell resource.

In some embodiments of this disclosure, the signal quality measurement quantity of the current serving cell includes any one or more of the following parameters: RSRP, RSRQ, and SINR.

In some embodiments of this disclosure, the trigger condition includes a hysteresis parameter value of the signal quality measurement quantity of the current serving cell and a threshold of the signal quality measurement quantity of the current serving cell.

In some embodiments of this disclosure, the handover module 503 is specifically configured to: if a sum of the signal quality measurement quantity of the current serving cell and the hysteresis parameter value of the signal quality measurement quantity of the current serving cell is less than the threshold of the signal quality measurement quantity of the current serving cell, determine that the trigger condition is satisfied.

Figure 6:
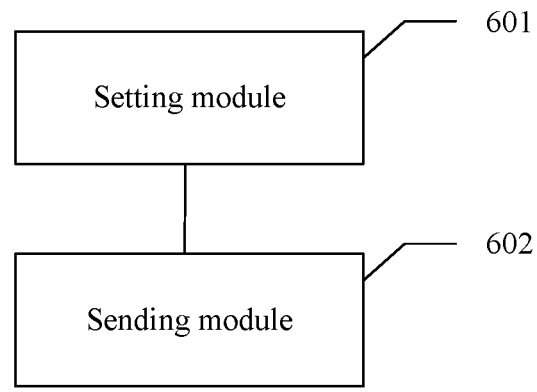
FIG. 6 is a schematic structural diagram of a network-side device according to an embodiment of this disclosure.

FIG. 6 is a schematic structural diagram of a network-side device according to an embodiment of this disclosure. The network-side device is corresponding to the resource configuration method. The network-side device specifically includes:

a setting module 601, configured to set at least one trigger condition for UE to use a target cell resource; and a sending module 602, configured to send configuration of the target cell resource, where the configuration of the target cell resource includes the at least one trigger condition for the UE to use the target cell resource, so that the UE evaluates, based on a signal quality measurement quantity of a current serving cell of the UE, whether the trigger condition is satisfied.

In some embodiments of this disclosure, the setting module 601 is specifically configured to: based on a protocol, preset the at least one trigger condition for the UE to use the target cell resource.

In some embodiments of this disclosure, the setting module 601 is specifically configured to: based on a network configuration, set the at least one trigger condition for the UE to use the target cell resource.

In some embodiments of this disclosure, the network configuration includes one of the following configuration manners: configuration independently by a source node, configuration by the source node after negotiation between the source node and a target node, configuration independently by the target node, and configuration by the target node after negotiation between the target node and the source node.

In some embodiments of this disclosure, the source node is a source base station in a handover process, and the target node is a target base station in the handover process; or the source node is a source SN, and the target node is a target SN; or the source node is a source MN, and the target node is a target SN.

In some embodiments of this disclosure, the signal quality parameter of the current serving cell includes any one or more of the following parameters: RSRP, RSRQ, and SINR.

In some embodiments of this disclosure, the trigger condition includes a hysteresis parameter value of the signal quality measurement quantity of the current serving cell and a threshold of the signal quality measurement quantity of the current serving cell.

In some embodiments of this disclosure, the sending module 602 is specifically configured to enable the UE to determine, based on whether a sum of the signal quality measurement quantity of the current serving cell and the hysteresis parameter value of the signal quality measurement quantity of the current serving cell is less than the threshold of the signal quality measurement quantity of the current serving cell, whether the trigger condition is satisfied.

Figure 7:
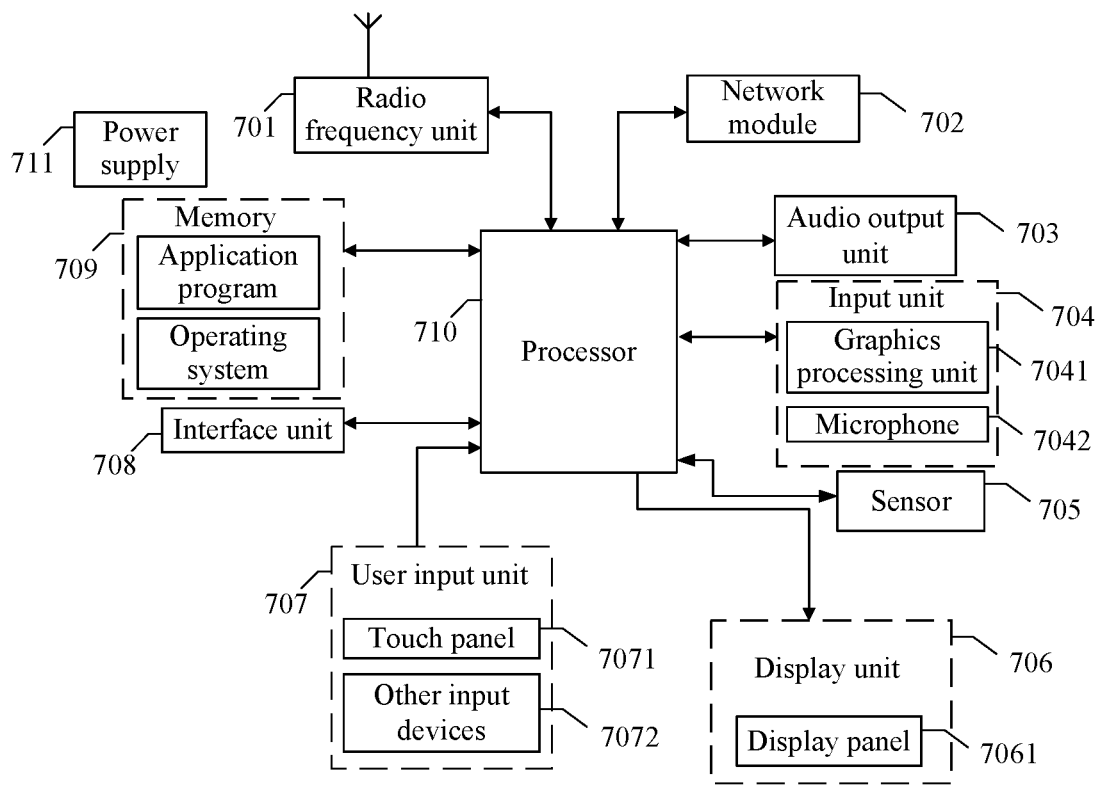
FIG. 7 is a schematic structural diagram of a mobile terminal according to some other embodiments of this disclosure.

FIG. 7 is a structural diagram of another mobile terminal implementing the embodiments of this disclosure. The mobile terminal includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. Persons skilled in the art may understand that the mobile terminal structure shown in FIG. 7 does not constitute a limitation on the mobile terminal. The mobile terminal may include more or fewer components than those shown in the figure, or some components may be combined, or there may be a different component layout. In an embodiment of this disclosure, the mobile terminal includes but is not limited to a mobile phone, a tablet computer, a notebook computer, a palmtop computer, an in-vehicle terminal, a wearable device, a pedometer, and the like.

The processor 710 is configured to:

receive configuration of at least one target cell resource, where the configuration of the at least one target cell resource includes at least one trigger condition for UE to use the target cell resource;

evaluate, based on the signal quality measurement quantity of the current serving cell of the UE, whether the at least one trigger condition is satisfied; and determine that the trigger condition is satisfied, and initiate, based on the configuration of the target cell resource, a communication process associated with the trigger condition.

The processor 710 is further configured to:

receive the configuration of the at least one target cell resource by using an RRC reconfiguration message.

The RRC reconfiguration message includes a newly defined information element, and the newly defined information element represents the trigger condition for the UE to use the target cell resource;

or;

the RRC reconfiguration message includes an information element of an A1 event, and the information element of the A1 event represents the trigger condition for the UE to use the target cell resource.

The signal quality measurement quantity of the current serving cell includes any one or more of the following parameters: RSRP, RSRQ, and SINR.

The trigger condition includes a hysteresis parameter value of the signal quality measurement quantity of the current serving cell and a threshold of the signal quality measurement quantity of the current serving cell.

The processor 710 is further configured to:

if a sum of the signal quality measurement quantity of the current serving cell and the hysteresis parameter value of the signal quality measurement quantity of the current serving cell is less than the threshold of the signal quality measurement quantity of the current serving cell, determine that the trigger condition is satisfied.

In the technical solution provided in this disclosure, whether the at least one trigger condition is satisfied can be evaluated based on the signal quality measurement quantity of the current serving cell of the UE. When it is determined that the trigger condition is satisfied, a communication process associated with the trigger condition is initiated based on the configuration of the target cell resource. In other words, it may be necessary to evaluate only a signal quality condition of the current serving cell, thereby reducing unnecessary measurement of the target cell for the evaluation and further reducing power consumption of the UE.

It should be understood that in this embodiment of this disclosure, the radio frequency unit 701 may be configured to: receive and send signals in an information receiving/sending process or a call process; and specifically, after receiving downlink data from a base station, send the downlink data to the processor 710 for processing, and, send uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and other devices through a wireless communications system.

The mobile terminal provides a user with wireless broadband internet access through the network module 702, for example, helping the user to send or receive an email, to browse a web page, or to access streaming media.

The audio output unit 703 may convert audio data received by the radio frequency unit 701 or the network module 702 or stored in the memory 709 into an audio signal and output the audio signal as a sound. Furthermore, the audio output unit 703 may also provide audio output (for example, a call signal received sound or a message received sound) related to a specific function performed by the mobile terminal. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042, and the graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another computer-readable storage medium) or sent by the radio frequency unit 701 or the network module 702. The microphone 7042 can receive a sound and can process the sound into audio data. The processed audio data can be converted, for outputting, into a format that can be sent to a mobile communication base station through the radio frequency unit 701 in a telephone call mode.

The mobile terminal further includes at least one sensor 705, for example, an optical sensor, a motion sensor, and other sensors. Specifically, the optical sensor includes an ambient light sensor and a proximity sensor. The ambient light sensor may adjust luminance of a display panel 7061 based on brightness of ambient light. When the mobile terminal moves near an ear, the proximity sensor may disable the display panel 7061 and/or backlight. As a type of motion sensor, an accelerometer sensor can detect magnitudes of accelerations in all directions (usually three axes), can detect a magnitude and a direction of gravity in a static state, and can be configured for mobile terminal posture recognition (such as switching between portrait and landscape modes, related games, and magnetometer posture calibration), functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information and generate key signal input related to user setting and function control of the mobile terminal. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 710, and receives and executes a command sent by the processor 710, to implement the touch panel 7071. The user input unit 707 may further include other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. Although the touch panel 7071 and the display panel 7061 serve as two independent parts to implement input and output functions of the mobile terminal in FIG. 7, in some embodiments, the touch panel 7071 and the display panel 7061 may be integrated to implement the input and output functions of the mobile terminal. This is not specifically limited herein.

The interface unit 708 is an interface connecting an external apparatus to the mobile terminal. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 708 may be configured to receive input (for example, data information and electric power) from the external apparatus, and transmit the received input to one or more elements in the mobile terminal; or may be configured to transmit data between the mobile terminal and the external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 709 may include a high-speed random access memory, or may include a non-volatile memory, for example, at least one magnetic disk storage device, a flash storage device, or other non-volatile solid-state storage devices.

The processor 710 is a control center of the mobile terminal, and is connected to all components of the mobile terminal by using various interfaces and lines. By running or executing a software program and/or module that is stored in the memory 709 and calling data stored in the memory 709, the processor 710 executes various functions of the mobile terminal and processes data, to perform overall monitoring on the mobile terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The mobile terminal may further include a power supply 711 (for example, a battery) that supplies power to each component. Optionally, the power supply 711 may be logically connected to the processor 710 by using a power management system, to implement functions such as charging management, discharging management, and power consumption management by using the power management system.

In addition, the mobile terminal includes some functional modules that are not shown, details of which are not described herein.

Optionally, an embodiment of this disclosure further provides a mobile terminal, including: a processor 710, a memory 709, and a computer program that is stored in the memory 709 and capable of running on the processor 710. When the computer program is executed by the processor 710, processes in the foregoing embodiments of the resource configuration method are implemented, with the same technical effects achieved. To avoid repetition, details are not described herein again.

Figure 8:
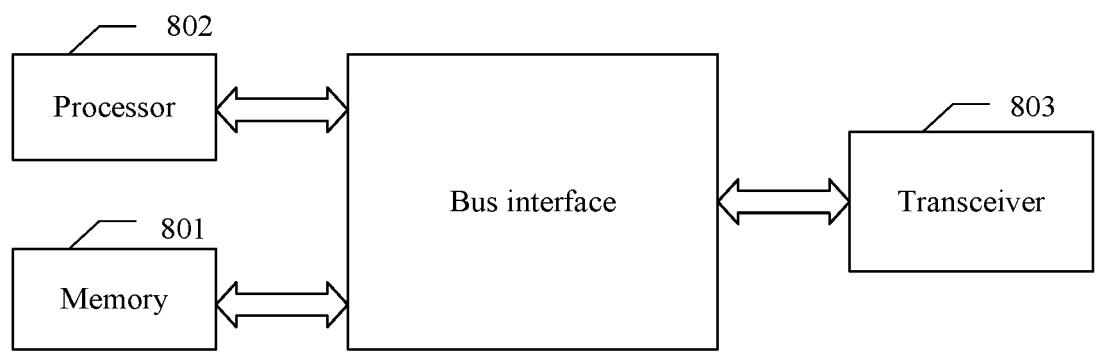
FIG. 8 is a schematic structural diagram of a network-side device according to some other embodiments of this disclosure.

FIG. 8 is a structural diagram of another network-side device according to an embodiment of this disclosure. The network-side device includes a memory 801, a processor 802, a transceiver 803, and a computer program that is stored in the memory 801 and capable of running on the processor 802.

The processor 802 is configured to:

set at least one trigger condition for UE to use a target cell resource; and send configuration of the target cell resource, where the configuration of the target cell resource includes the at least one trigger condition for the UE to use the target cell resource, so that the UE evaluates, based on a signal quality measurement quantity of a current serving cell of the UE, whether the trigger condition is satisfied.

The processor 802 is further configured to:

based on a protocol, preset the at least one trigger condition for the UE to use the target cell resource.

The processor 802 is further configured to:

based on a network configuration, set the at least one trigger condition for the UE to use the target cell resource.

The network configuration includes one of the following configuration methods: configuration independently by a source node, configuration by the source node after negotiation between the source node and a target node, configuration independently by the target node, and configuration by the target node after negotiation between the target node and the source node.

The source node is a source base station in a handover process, and the target node is a target base station in the handover process; or the source node is a source secondary node SN, and the target node is a target SN; or the source node is a source master node MN, and the target node is a target SN.

The signal quality parameter of the current serving cell includes any one or more of the following parameters: RSRP, RSRQ, and SINR.

The trigger condition includes a hysteresis parameter value of the signal quality measurement quantity of the current serving cell and a threshold of the signal quality measurement quantity of the current serving cell.

The processor 802 is further configured to:

determine, based on whether a sum of the signal quality measurement quantity of the current serving cell and the hysteresis parameter value of the signal quality measurement quantity of the current serving cell is less than the threshold of the signal quality measurement quantity of the current serving cell, whether the trigger condition is satisfied.

In FIG. 8, a bus architecture may include any quantity of interconnected buses and bridges, and specifically connect together various circuits of one or more processors represented by the processor 802 and a memory represented by the memory 801. The bus architecture may further interconnect various other circuits such as a peripheral device, a voltage regulator, and a power management circuit. These are all well known in the art, and therefore are not further described in this specification. A bus interface provides interfaces. The transceiver 803 may be a plurality of elements, including a transmitter and a transceiver and provides units that are configured to: perform communication with various other apparatuses over a transmission medium, and receive and send data under control of the processor 802. The processor 802 is responsible for management of the bus architecture and general processing, and the memory 801 may store data used by the processor 802 when the processor 802 performs an operation. An embodiment of this disclosure further provides a computer-readable storage medium, where the computer-readable storage medium stores a computer program. When the computer program is executed by a processor, the processes of the foregoing embodiments of the resource configuration method are implemented, with the same technical effects achieved. To avoid repetition, details are not described herein again. For example, the computer-readable storage medium is a read-only memory (ROM), a random access memory (RAM), a magnetic disk, or an optical disk.

Finally, it should be noted that the foregoing embodiments are merely intended for describing the technical solutions of this disclosure, instead of limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this disclosure.

What is claimed is:

1. A resource configuration method, comprising:
   receiving configuration of at least one target cell resource, wherein the configuration of the at least one target cell resource comprises at least one trigger condition for user equipment (UE) to use the target cell resource; wherein the trigger condition for the UE to use the target cell resource is set based on the target cell, and each target cell has at least one trigger condition of the corresponding target cell resource;
   based on a signal quality measurement quantity of a current serving cell of the UE, evaluating whether the at least one trigger condition is satisfied; and
   determining that the trigger condition is satisfied, and initiating, based on the configuration of the target cell resource, a communication process associated with the trigger condition;
   wherein the communication process comprises one or more of an RRC re-establishment process, secondary cell group, SCG, addition in a dual connectivity (DC) architecture, SCG modification in the DC architecture;
   in a case that the communication process is the RRC re-establishment process, the configuration of the at least one target cell resource comprises the trigger condition and integrity protection check failure;
   in a case that the communication process is adding an SCG in the DC architecture, the configuration of the at least one target cell resource comprises the trigger condition and that a data rate of the UE does not satisfy the service requirement;
   in a case that the communication process is modifying the SCG in the DC architecture, the configuration of the at least one target cell resource comprises the trigger condition and that a packet loss rate of the UE does not satisfy a service requirement.

2. The resource configuration method according to claim 1, wherein the receiving configuration of at least one target cell resource comprises:
   receiving the configuration of the at least one target cell resource by using a radio resource control RRC reconfiguration message.

3. The resource configuration method according to claim 2, wherein the RRC reconfiguration message comprises a newly defined information element, and the newly defined information element represents the trigger condition for the UE to use the target cell resource;
   or;
   the RRC reconfiguration message comprises an information element of an A1 event, and the information element of the A1 event represents the trigger condition for the UE to use the target cell resource.

4. The resource configuration method according to claim 1, wherein the signal quality measurement quantity of the current serving cell comprises any one or more of the following parameters: reference signal received power RSRP, reference signal received quality RSRQ, and signal to interference plus noise ratio SINK.

5. The resource configuration method according to claim 1, wherein the trigger condition comprises a hysteresis parameter value of the signal quality measurement quantity of the current serving cell and a threshold of the signal quality measurement quantity of the current serving cell.

6. The resource configuration method according to claim 5, wherein the determining that the trigger condition is satisfied comprises:
   if a sum of the signal quality measurement quantity of the current serving cell and the hysteresis parameter value of the signal quality measurement quantity of the current serving cell is less than the threshold of the signal quality measurement quantity of the current serving cell, determining that the trigger condition is satisfied.

7. A non-transitory computer-readable storage medium storing a computer program instruction thereon, wherein when the computer program instruction is executed by a processor, the steps of the resource configuration method according to claim 1 are implemented.

8. A resource configuration method, comprising:
   setting at least one trigger condition for user equipment UE to use a target cell resource; wherein the trigger condition for the UE to use the target cell resource is set based on the target cell, and each target cell has at least one trigger condition of the corresponding target cell resource; and
   sending configuration of the target cell resource, wherein the configuration of the target cell resource comprises the at least one trigger condition for the UE to use the target cell resource, so that the UE evaluates, based on a signal quality measurement quantity of a current serving cell of the UE, whether the trigger condition is satisfied, and determines whether to initiate a communication process associated with the trigger condition;
   wherein the communication process comprises one or more of an RRC re-establishment process, secondary cell group, SCG, addition in a dual connectivity (DC) architecture, SCG modification in the DC architecture;
   in a case that the communication process is the RRC re-establishment process, the configuration of the at least one target cell resource comprises the trigger condition and integrity protection check failure;

in a case that the communication process is adding an SCG in the DC architecture, the configuration of the at least one target cell resource comprises the trigger condition and that a data rate of the UE does not satisfy the service requirement;

in a case that the communication process is modifying the SCG in the DC architecture, the configuration of the at least one target cell resource comprises the trigger condition and that a packet loss rate of the UE does not satisfy a service requirement.

9. The resource configuration method according to claim 8, wherein the setting at least one trigger condition for UE to use a target cell resource comprises:
based on a protocol, presetting the at least one trigger condition for the UE to use the target cell resource.

10. The resource configuration method according to claim 8, wherein the setting at least one trigger condition for UE to use a target cell resource comprises:
based on a network configuration, setting the at least one trigger condition for the UE to use the target cell resource.

11. The resource configuration method according to claim 10, wherein the network configuration comprises one of the following configuration manners:
configuration independently by a source node, configuration by the source node after negotiation between the source node and a target node, configuration independently by the target node, and configuration by the target node after negotiation between the target node and the source node.

12. The resource configuration method according to claim 11, wherein the source node is a source base station in a handover process, and the target node is a target base station in the handover process;
or;
the source node is a source secondary node SN, and the target node is a target SN;
or;
the source node is a source master node MN, and the target node is a target SN.

13. The resource configuration method according to claim 8, wherein a signal quality parameter of the current serving cell comprises any one or more of the following parameters: reference signal received power RSRP, reference signal received quality RSRQ, and signal to interference plus noise ratio SINK.

14. The resource configuration method according to claim 8, wherein the trigger condition comprises a hysteresis parameter value of the signal quality measurement quantity of the current serving cell and a threshold of the signal quality measurement quantity of the current serving cell.

15. The resource configuration method according to claim 14, wherein that the UE evaluates, based on the signal quality measurement quantity of the current serving cell of the UE, whether the trigger condition is satisfied comprises:
based on whether a sum of the signal quality measurement quantity of the current serving cell and the hysteresis parameter value of the signal quality measurement quantity of the current serving cell is less than the threshold of the signal quality measurement quantity of the current serving cell, determining whether the trigger condition is satisfied.

16. A network-side device, comprising:
a memory, configured to store a program; and
a processor, configured to run the program stored in the memory, to execute the resource configuration method according to claim 8.

17. A non-transitory computer-readable storage medium storing a computer program instruction thereon, wherein when the computer program instruction is executed by a processor, the steps of the resource configuration method according to claim 8 are implemented.

18. User equipment (UE), comprising:
a memory, configured to store a program; and
a processor, configured to run the program stored in the memory, to execute:
receiving configuration of at least one target cell resource, wherein the configuration of the at least one target cell resource comprises at least one trigger condition for the UE to use the target cell resource; wherein the trigger condition for the UE to use the target cell resource is set based on the target cell, and each target cell has at least one trigger condition of the corresponding target cell resource;
based on a signal quality measurement quantity of a current serving cell of the UE, evaluating whether the at least one trigger condition is satisfied; and
determining that the trigger condition is satisfied, and initiating, based on the configuration of the target cell resource, a communication process associated with the trigger condition;
wherein the communication process comprises one or more of an RRC re-establishment process, secondary cell group, SCG, addition in a dual connectivity (DC) architecture, SCG modification in the DC architecture;
in a case that the communication process is the RRC re-establishment process, the configuration of the at least one target cell resource comprises the trigger condition and integrity protection check failure;
in a case that the communication process is adding an SCG in the DC architecture, the configuration of the at least one target cell resource comprises the trigger condition and that a data rate of the UE does not satisfy the service requirement;
in a case that the communication process is modifying the SCG in the DC architecture, the configuration of the at least one target cell resource comprises the trigger condition and that a packet loss rate of the UE does not satisfy a service requirement.

19. The UE according to claim 18, wherein the processor is further configured to run the program stored in the memory, to execute:
receiving the configuration of the at least one target cell resource by using a radio resource control RRC reconfiguration message.

20. The UE according to claim 19, wherein the RRC reconfiguration message comprises a newly defined information element, and the newly defined information element represents the trigger condition for the UE to use the target cell resource;
or;
the RRC reconfiguration message comprises an information element of an A1 event, and the information element of the A1 event represents the trigger condition for the UE to use the target cell resource.

* * * * *